United States Patent [19]
Taeymans et al.

[11] 3,847,094
[45] Nov. 12, 1974

[54] TREATMENT OF COMBUSTIBLE RESIDUE

[75] Inventors: Aloïs Taeymans; Georges Dumont; Willem Balleux, all of Mol, Belgium

[73] Assignee: Belgonucleaire, Brussels, Belgium

[22] Filed: Sept. 5, 1973

[21] Appl. No.: 394,444

[30] Foreign Application Priority Data
Sept. 6, 1972  Belgium .............................. 121748

[52] U.S. Cl. ...................... 110/8 R, 23/284, 55/99, 55/474, 55/479, 110/119
[51] Int. Cl. ............................................. F23g 5/00
[58] Field of Search .......... 55/99, 474, 479; 23/284; 110/8 R, 8 A, 119

[56] References Cited
UNITED STATES PATENTS

| | | | |
|---|---|---|---|
| 1,570,869 | 1/1926 | Thomson et al. ...................... 55/99 |
| 2,871,004 | 1/1959 | Gorin ............................... 110/28 X |
| 3,296,775 | 1/1967 | Squires ............................ 55/474 X |
| 3,487,620 | 1/1970 | Klein et al. ...................... 110/119 X |
| 3,509,835 | 5/1970 | Dibelius et al. ......................... 110/8 |
| 3,770,388 | 11/1973 | Zenz ................................. 55/474 X |

*Primary Examiner*—Kenneth W. Sprague
*Attorney, Agent, or Firm*—Ostrolenk, Faber, Gerb & Soffen

[57] ABSTRACT

A process and an apparatus for performance of the process for treating incinerated materials to filter out particles and for regenerating the filter: the fumes and particle waste produced by a furnace are passed through a fluidized bed of granules wherein they are further incinerated and they then pass through a filter of granules where the particles are removed; when the filter becomes contaminated, the pressure drop caused thereby is sensed and contaminated granules are ejected therefrom into the fluidized bed; granules in the fluidized bed are simultaneously transferred back to the filter.

12 Claims, 1 Drawing Figure

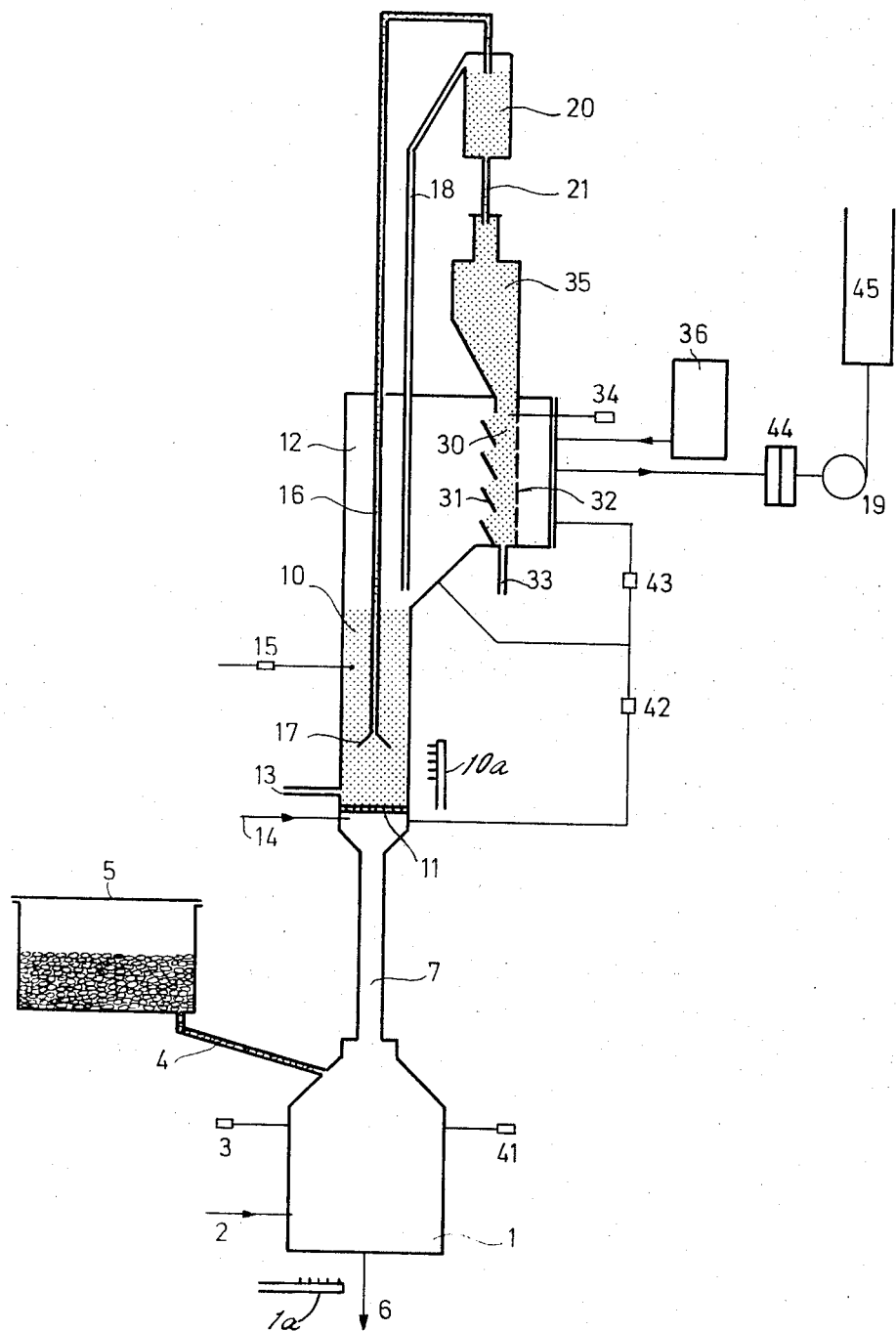

TREATMENT OF COMBUSTIBLE RESIDUE

This invention relates to the treatment of residue produced by incineration and, more particularly, to the treatment of noncombusted particles contained in combustion gases or fumes from an incineration furnace.

It is known that combustible residue can be treated by incineration at high temperature. The combustion gases of an incinerating furnace, however, contain noncombusted particles, often called soot. Because soot may not always be permitted to be evacuated into the atmosphere, it must then be separated from the gas stream. To this end the gases are usually directed through filters before their evacuation through a stack. A drawback of such filters is that they soon choke and thus must be regularly replaced, cleaned out, or regenerated according to the type used.

This invention proposes a process and an apparatus for purifying the gases given off by an incinerating oven, using an auto-regenerating filter.

According to the process of this invention, the fumes produced by incineration of combustible residue in a furnace are directed to a filter of the granule bed type before being evacuated through the stack. The granules of this filter are regenerated by incineration in a fluidized bed that preferably contains the same type of granules as is used in the filter.

According to a further embodiment of the invention, the fumes from incineration of combustible residue in a furnace, containing unburnt or partially burnt particles, are at least partially re-incinerated in the above noted fluidized bed. Afterwards, they are directed through the filter of the granule bed type which retains the unburnt or partially burnt particles. The particle holding granules used in this filter are regenerated by transfer to and then incineration in the fluidized bed.

The above described process replaces the granules removed from the filter with those in the fluidized bed. Thus, granules from the filter containing unburnt particles can be regenerated in the fluidized bed and can afterwards be re-used in the filter. These exchanges of granules will preferably take place simultaneously.

The invention also proposes an improved apparatus for treating combustible residue, comprising a furnace, a fluidized bed and a filter of the granule bed type.

Any furnace, with either internal or eternal heating, may be used. The furnace may work at atmospheric or subatmospheric pressure. It may be fitted with a grid or with a layer of ceramic granules, such as sand for instance, and it may be provided with a device for extracting and treating the ashes produced.

The fluidized bed may contain any filling material apt to be used with a view to the combustion of gases, such as granules or ceramic granules, i.e., sand and others. The fluidized bed preferably has a columnar form. At its inlet is a perforated sheet or grid for gas distribution. In a preferred embodiment, the fluidized bed comprises an expansion chamber at its upper part to reduce the velocity of the gases.

The filter is of the granule bed type. It is preferably open so that the filling granules may be removed. In a preferred embodiment, the filter is of the "panel bed" type, from which granules may be removed by overpressure.

In a preferred embodiment, the load of the filter is compatible with that of the fluidized bed and, preferably, consists of the same material, like sand.

The apparatus according to the invention is preferably fitted with a mechanism for transferring the granule load of the fluidized bed to the filter or to a container connected to the filter and with a device for transporting the granule load of the filter to the fluidized bed. In a preferred embodiment, the transport device starts operating as soon as the pressure drop across the filter passes beyond a predetermined level which would indicate that the filter is becoming clogged with particles. Advantageously, the transport device and the transfer mechanism simultaneously start operating.

Other characteristics of the invention will be apparent from the non-limitative example described hereafter with reference to the accompanying Drawing, which schematically represents an apparatus according to the invention.

The Drawing shows a furnace 1 with external gas-heater 1a. The furnace incinerates the material in it at 900°C. and operates at a pressure slightly below the atmospheric pressure. The furnace comprises an air inlet 2, a thermocouple 3, a device for supplying burnable material comprising a supply duct 4 and a supply container 5, an ash outlet 6, and a fume outlet 7.

The fumes containing unburnt particles, soot, and ash dust then pass through the fluidized bed 10. Bed 10 is comprised of a column filled up to 40 cm. in height with sand. The grains of sand have a diameter between 0.60 and 0.15 mm.

The temperature of the bed 10 is raised to 900°C. by external gas-heater 10a. The bed, at its lower part, has a grid for supplying and distributing the gases. Grid 11 is comprised of a perforated plate, the orifices of which are less than 0.10 mm. in diameter. The upper part of bed 10 is comprised of an expansion chamber 12, the pressure in which is adjustable by means of the pump 19 to cause the fumes and particles to pass through filter 30. The bed 10 is also provided with an inlet and outlet 13 for the filling material, an air inlet 14, and a thermocouple 15. The bed has a transfer mechanism 16 in it to transfer the sand from the bed through transfer mechanism inlet 17 to enclosure 20. The fumes pass through the fluidized bed where the combustion of the unburnt particles takes place, and leave by the expansion chamber 12.

According to an alternate embodiment, the fumes from the oven 1 may be directly conveyed to the expansion chamber 12, without passing through a fluidized bed. This altered embodiment may, for instance, be considered if the furnace is of an improved type, wherein the combustion ordinarily takes place at very high temperatures.

The expansion chamber 12 is connected to the stack 45 through a "panel bed" filter 30. This filter comprises, on the gas inlet side, inclined metallic shutters or louvers 31, and, on the gas outlet side, a perforated plate 32. The filter is filled with sand of the same characteristics as the sand used in the fluidized bed. The filter also comprises a thermocouple 34, a sand removal duct 33 in its lower part, and, in its upper part, a supply tank 35, connected to the enclosure 20 by the duct 21. The outlet side 32 of the filter is connected to a device 36 that is adapted to supply compressed air and that starts operation as soon as the pressure drop across the filter passes beyond a predetermined level.

The apparatus also comprises manometers 41, 42, and 43, respectively indicating the pressure on the furnace 1, the pressure drop across the fluidized bed 10 and the pressure drop across the filter 30. A control filter 44 allows inspection of the ash particles carried along by the fumes after their passage through the filter 30 and before their evacuation through the stack 45.

The transfer mechanism is comprised of inlet bell 17 and a transport tube 16 that operates as an elevator. Owing to the greater pressure in the bottom part of bed 10 from the fumes entering the bed, the gas-sand mixture passes through the tube 16 into the enclosure 20 wherein gas and sand are separated by expansion and gravity. The gas returns to the fluidized bed by means of overflow pipe 18. The position of the bell 17 may be adjusted in height, so that it may open into the upper or the lower part of the fluidized bed as a particular effective operation requires.

The operation of this apparatus is now described. Material such as paper, synthetic materials, rubber, wood, textiles, is incinerated in the furnace 1. If necessary, the incineration gases are burnt once more in the fluidized bed 10. From bed 10 the gases pass through the filter 30 and are evacuated by the stack 45.

When the pressure drop across the filter 30 passes beyond a certain level, for instance 10 mm. mercury, manometer 43 senses this and is connected with compressed air mechanism 36 to immediately start it operating and driving out a quantity of sand grains through the metallic louvers or shutters 31 into chamber 12 of bed 10. Mechanism 36 continues to operate until the pressure drop across filter 30 decreases to a desired level indicating a sufficient quantity of dirty granules and fume particles have been expelled from the filter. The expelled sand grains and particles fall in the fluidized bed where the sand granules are regenerated by combustion. The supply tank 35 automatically refills emptying filter 30. Tank 35 is filled by means of the duct 21, the enclosure 20 and the transfer mechanism.

The advantage of the invention is that it enables continuous incineration of residue without requiring regular replacement and regeneration of the filtering system, because the proposed filter system is automatically regenerated.

Of course, the invention is not limited to the embodiment described and may be adapted to other conditions.

For instance, the filling material for the fluidized bed may be adapted to also absorb noxious materials contained in the incineration gases.

Although there have been described preferred embodiments of this novel invention, many variations and modifications will now become apparent to those skilled in the art. Therefore, this invention is to be limited not by the specific disclosure herein but only by the appending claims.

The embodiments of the invention is which an exclusive property or privilege is claimed are defined as follows:

1. A process for treating incinerated material to filter out particles and for regenerating the filter comprising the steps of:
   incinerating the material, thereby generating fumes and particles;
   passing the fumes and particles through a filter of the granule bed type to filter out the particles, the particles being retained among the filter granules;
   regenerating the granules by transferring them from the filter into a fluidized bed of such granules and incinerating the granules in the bed, thereby destroying the particles;
   returning the regenerated granules to the filter;
   after incineration of the material, first passing the fumes and particles through the fluidized bed.

2. A process for treating incinerated material to filter out particles and for regenerating the filter comprising the steps of:
   incinerating the material, thereby generating fumes and particles;
   passing the fumes and particles through a filter of the granule bed type to filter out the particles, the particles being retained among the filter granules;
   regenerating the granules by transferring them from the filter into a fluidized bed of such granules and incinerating the granules in the bed, thereby destroying the particles; measuring the pressure drop across the filter, and when that drop exceeds a predetermined level, commencing the transfer of granules from the filter to the fluidized bed;
   returning the regenerated granules to the filter; simultaneously with transfer of granules from the filter to the bed.

3. A process for treating incinerated material to filter out particles and for regenerating the filter comprising the steps of:
   incinerating the material, thereby generating fumes and particles;
   passing the fumes and particles through a filter of the granule bed type to filter out the particles, the particles being retained among the filter granules;
   regenerating the granules by transferring them from the filter into a fluidized bed of such granules and incinerating the granules in the bed, thereby destroying the particles; measuring the pressure drop across the filter, and when that drop exceeds a predetermined level, commencing the transfer of granules from the filter to the fluidized bed; returning the regenerated granules from the filter to the fluidized bed; returning the regenerated granules to the filter;
   the granules in the fluidized bed and in the filter are of the same material.

4. The process of claim 3, wherein the granules are of ceramic material.

5. The process of claim 3, wherein the granules are of sand.

6. An apparatus for treating incinerated material to filter out particles and for regenerating the filter comprising:
   a furnace for incinerating material; said furnace having a fume and burnt particle outlet;
   a filter connected to said furnace outlet to receive and filter and trap particles in the fumes; said filter having a bed and being of the type using loose granules located in said bed for filtering out particles; means directing the fumes and particles through said granule bed and said granules;
   a fluidized bed containing said granules; means for fluidizing said fluidized bed, means for heating said fluidized bed to incinerate particles mixed with the granules therein;

means for transferring granules from said filter to said fluidized bed for regeneration in the latter.

7. The apparatus of claim 6, wherein said furnace outlet is connected to said fluidized bed and that said bed communicates with said filter such that the fumes and particles passing to said filter first pass through said fluidized bed.

8. The apparatus of claim 6, further comprising means for sensing the pressure drop across said filter; said means for transferring granules from said filter to said fluidized bed being connected to said pressure drop sensing means and being responsive to and operative when the pressure drop exceeds a predetermined level.

9. The apparatus of claim 8, wherein said filter bed comprises a container with a side that communicates with said fluidized bed, which permits granules in said filter to pass therethrough; said means for transferring granules from said filter comprises a compressed air supply positioned to blow granules out said filter side communicating with said fluidized bed.

10. The apparatus of claim 7, wherein said fluidized bed has a lower section and an upper section, with the latter having a larger volume to retain said granules therein and prevent their moving through said filter.

11. The apparatus of claim 7 further comprising:
a granule transfer conduit extending upwardly out of said fluidized bed and communicating with said filter thereby to transmit granules and fumes from said fluidized bed to said filter.

12. The apparatus of claim 11, wherein said granule transfer conduit is connected to a storage enclosure for granules transferred from said fluidized bed; said storage compartment being wider than said granule transfer conduit and having an opening at its top for fumes and particles, while said granules settle in said storage enclosure; said storage enclosure is connected to said filter and delivers granules thereto.

* * * * *